(12) United States Patent
Leopoldseder et al.

(10) Patent No.: US 11,392,356 B1
(45) Date of Patent: Jul. 19, 2022

(54) ONLINE MACHINE LEARNING BASED COMPILATION

(71) Applicant: Oracle International Corporation, Redwood Shores, CA (US)

(72) Inventors: David Leopoldseder, Vienna (AT); Raphael Mosaner, Steyr (AT); Lukas Stadler, Linz (AT)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/187,575

(22) Filed: Feb. 26, 2021

(51) Int. Cl.
*G06F 8/41* (2018.01)
*G06F 16/901* (2019.01)
*G06N 20/00* (2019.01)

(52) U.S. Cl.
CPC .......... *G06F 8/443* (2013.01); *G06F 16/9024* (2019.01); *G06N 20/00* (2019.01)

(58) Field of Classification Search
CPC ...... G06F 16/9024; G06F 8/443; G06N 20/00
See application file for complete search history.

(56) References Cited

U.S. PATENT DOCUMENTS

| | | | | |
|---|---|---|---|---|
| 9,594,854 B1* | 3/2017 | Orofino | ............... | G06F 30/00 |
| 2010/0037212 A1* | 2/2010 | Meijer | ............... | G06F 8/427 |
| | | | | 717/142 |
| 2011/0167088 A1* | 7/2011 | Warren | ............... | G06F 8/427 |
| | | | | 707/E17.012 |
| 2013/0291113 A1* | 10/2013 | Dewey | ............... | G06F 8/433 |
| | | | | 726/25 |

OTHER PUBLICATIONS

Wu et al., "Compilation Optimization Pass Selection Using Gate Graph Attention Neural Network for Reliability Improvement" (Year: 2020).*
Li et al., "Feature Mining for Machine Learning based Compilation Optimization" (Year: 2014).*
Wang et al., "Machine Learning in Compiler Optimization" (Year: 2018).*
Stephenson et al., "Meta Optimization: Improving Compiler Heuristics with Machine Learning" (Year: 2003).*
Tartara, M. et al., "Continuous Learning of Compiler Heuristics"; ACM Trans. Architec. Code Optim. 9, 4, Article 46; Jan. 2013 (25 pages).

(Continued)

*Primary Examiner* — Phillip H Nguyen
(74) *Attorney, Agent, or Firm* — Ferguson Braswell Fraser Kubasta PC

(57) ABSTRACT

A method may include extracting, from an initial compilation graph and for an optimization parameter, a feature. The initial compilation graph may be generated from a function in source code. The method may further include applying, to the initial compilation graph, values of the optimization parameter to generate versions of the initial compilation graph. The versions of the initial compilation graph may correspond to the values of the optimization parameter. The method may further include executing the versions of the initial compilation graph to obtain values of a performance metric, and selecting, as an optimized compilation graph and using the values of the performance metric, a version of the initial compilation graph.

20 Claims, 6 Drawing Sheets

(56) References Cited

OTHER PUBLICATIONS

Haj-Ali, A. et al.; "AutoPhase: Compiler Phase-Ordering for HLS with Deep Reinforcement Learning"; 2019 IEEE 27th Annual International Symposium on Field-Programmable Custom Computing Machines, Apr. 28-May 1, 2019 (1 page).

Kulkarni, S. et al.; "Automatic Construction of Inlining Heuristics using Machine Learning"; CGO 2013, Feb. 23-27, 2013, Shenzhen, China (12 pages).

* cited by examiner

ONLINE MACHINE LEARNING BASED COMPILATION

BACKGROUND

Machine learning based on models that are trained offline has been shown to outperform heuristics-based optimizations in static (ahead-of-time) compilers. In contrast, a dynamic compiler emits compiled and/or optimized code while executing the code, at run time. The performance of a dynamic compiler depends on efficient decision-making regarding whether and how to perform compiler optimizations. The application of machine learning in dynamic compilers to perform compiler optimizations while leveraging online training at run time is limited due to increased compilation time, thus often degrading the performance and usability of the dynamic compiler.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including extracting, from an initial compilation graph and for an optimization parameter, a feature. The initial compilation graph is generated from a function in source code. The method further includes applying, to the initial compilation graph, values of the optimization parameter to generate versions of the initial compilation graph. The versions of the initial compilation graph correspond to the values of the optimization parameter. The method further includes executing the versions of the initial compilation graph to obtain values of a performance metric, and selecting, as an optimized compilation graph and using the values of the performance metric, a version of the initial compilation graph.

In general, in one aspect, one or more embodiments relate to a system including a computer processor, a repository configured to store (i) source code including a function, (ii) an initial compilation graph generated from the function, and (iii) an optimized compilation graph. The system further includes a dynamic compiler, executing on the computer processor and configured to extract, from the initial compilation graph and for an optimization parameter, a feature, and apply, to the initial compilation graph, values of the optimization parameter to generate versions of the initial compilation graph. The versions of the initial compilation graph correspond to the values of the optimization parameter. The dynamic compiler is further configured to execute the versions of the initial compilation graph to obtain values of a performance metric, and select, as an optimized compilation graph and using the values of the performance metric, a version of the initial compilation graph.

In general, in one aspect, one or more embodiments relate to a method including extracting, from an initial compilation graph and for an optimization parameter, a feature. The initial compilation graph is generated from a function in source code. The method further includes generating feature clusters by clustering features included in training data of a machine learning model, determining that the feature matches a feature cluster in the feature clusters, predicting a value of the optimization parameter by applying the machine learning model to the optimization parameter and the feature, and applying, to the initial compilation graph, the value of the optimization parameter to generate an optimized compilation graph.

Other aspects of the invention will be apparent from the following description and the appended claims.

DETAILED DESCRIPTION

Figure 1A:
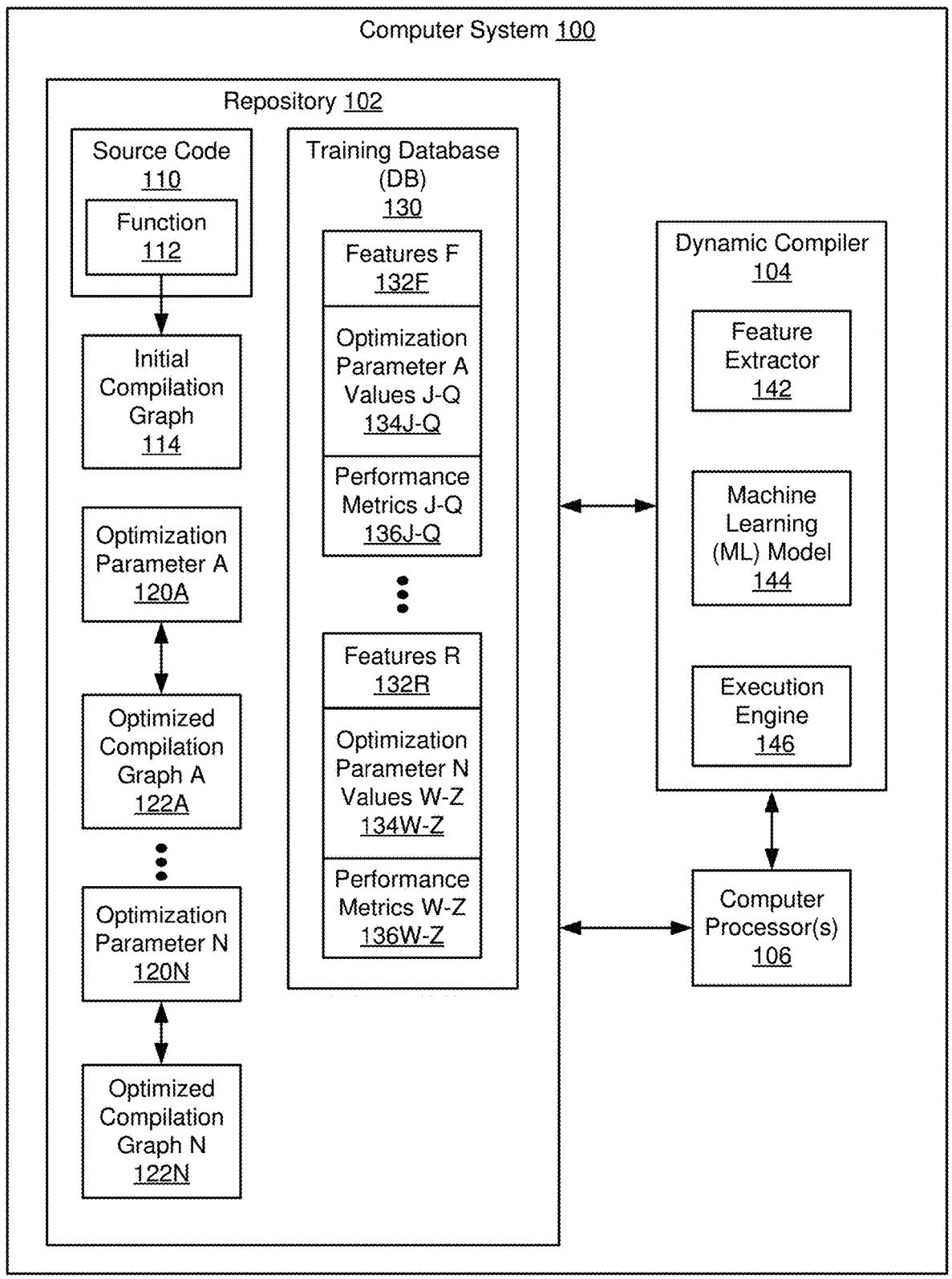
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to optimizing a compilation graph. A compilation graph is a graph representation of the syntactic structure of a function in source code. The compilation graph includes nodes corresponding to the syntactic constructs of the function, such as variables, expressions, statements, etc. A feature may be extracted from an initial compilation graph for an optimization parameter. The optimization parameter controls how to apply an optimization. For example, for a loop peeling optimization, the value of an optimization parameter may indicate which of two loops are to be peeled. Further, the feature extracted for the loop peeling optimization parameter may include a number of loops or a maximum loop depth in the initial compilation graph as well as structural information about the loop to be peeled.

Values of the optimization parameter may be applied to the initial compilation graph to generate multiple versions of the initial compilation graph. Each version of the initial compilation graph corresponds to a value of the optimization parameter. A dynamic compiler may evaluate the performance of the multiple versions of the initial compilation graph by obtaining performance metrics while executing the multiple versions of the initial compilation graph. The performance metrics may be used to train a machine learning model. The training may be offline, for example, using a benchmark function to train a baseline domain-independent model. Alternatively, the training may be online when the function is executed by a user. A value of the optimization parameter is selected by applying the machine learning model to the optimization parameter and the feature. A version of the initial compilation graph that corresponds to the selected value of the optimization parameter may be selected as an optimized compilation graph. A series of one or more optimized compilation graphs may be generated by applying an optimization parameter to the previous optimized compilation graph in the series.

One or more embodiments of the invention are now described using the drawings or images shown in one or more of the various figures described and shown below. The invention should not be limited or constrained by the figures as described.

FIG. 1A shows a computer system (100) in accordance with one or more embodiments of the invention. As shown in FIG. 1A, the computer system (100) includes a repository (102), a dynamic compiler (104), and computer processor(s) (106). In one or more embodiments, the computer system (100) takes the form of the computing system (500) described with respect to FIG. 5A and the accompanying description below or take the form of the client device (526) described with respect to FIG. 5B.

In one or more embodiments, the repository (102) is any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site. The repository (106) may be accessed online via a cloud service (e.g., Amazon Web Services (AWS), Egnyte, Azure, etc.).

In one or more embodiments, the repository (102) includes functionality to store source code (110), an initial compilation graph (114), optimization parameters (120A, 120N), optimized compilation graphs (122A, 122N), and a training database (130). The source code (110) may be a collection of computer instructions (e.g., statements) written in a human-readable programming language. The source code (110) may include at least one function (112). A function (112) may include functionality to produce outputs (e.g., return values) using inputs. Examples of functions (112) include methods, procedures, etc.

An initial compilation graph (114) is a graph representation of the syntactic structure of a function (112). The initial compilation graph (114) may further represent semantics of the function (112). For example, executing the initial compilation graph (114) may yield the same result as executing the textual representation of the function (112) in the source code (110). The initial compilation graph (114) may be generated from a function (112) by a compiler (e.g., dynamic compiler (104)). The initial compilation graph (114) includes nodes corresponding to the syntactic constructs of the function (112). The syntactic constructs may include variables, constants, operators, expressions, statements, function invocations, classes, declarations, identifiers, etc.

The dynamic compiler (104) includes functionality to generate an optimized compilation graph (122A) by applying an optimization to the initial compilation graph (114). The optimization is a modification to the initial compilation graph (114) that attempts to improve the performance of the initial compilation graph (114). Although the optimization modifies the syntax of the initial compilation graph (114), executing the initial compilation graph (114) may continue to yield the same result as executing the textual representation of the function (112) in the source code (110). The modification may add, delete, and/or modify one or more nodes of the initial compilation graph (114). For example, the optimization may attempt to increase the execution speed and/or reduce the size of the initial compilation graph (114). Examples of optimizations may include: loop peeling, loop unrolling, constant folding, conditional elimination, escape analysis, scalar replacement, read elimination, strength reduction, etc. In one or more embodiments, the optimizations may be obtained from a library of compiler optimizations (e.g., specific to a programming language and/or compiler).

The optimization may be applied according to at least one optimization parameter (120A). That is, the optimization parameter (120A) controls when and if the optimization is to be applied. The optimization parameter (120A) further controls how to apply the optimization. For example, for a loop peeling optimization, the value of an optimization parameter may indicate which of two loops are to be peeled once. In one or more embodiments, the optimization parameter (120A) is a Boolean parameter that indicates whether and/or how to apply the corresponding optimization. For example, a loop peeling optimization parameter value may be a Boolean expression indicating which of two loops are to be peeled. Continuing this example, the loop peeling optimization parameter value may be (not(loopA) and loopB), indicating that loopB, but not loopA, is to be peeled. Other examples of optimization parameters may include: inlining depth, cost models for assessing the quality of optimization opportunities, etc.

The optimization parameter (120A) (e.g., a Boolean parameter) may have a finite set of possible values. Alternatively, the optimization parameter (120A) (e.g., a numerical parameter) may have an infinite set of possible values. The optimization parameter (120A) may have a complex structure. For example, the optimization parameter (120A) may include multiple sub-parameters used for complex optimizations. However, as a best practice, the optimization parameter (120A) may be defined as fine grained as possible, in order to avoid defining the optimization parameter (120A) in terms of multiple sub-parameters (e.g., because the multiple sub-parameters may interfere with one another).

Continuing with FIG. 1A, the dynamic compiler (104) includes functionality to compile the source code (110) while the source code (110) is being executed (e.g., by the computer processor (106)). For example, the dynamic compiler (104) includes functionality to compile a function (112) in the source code (110) during the execution of the function (112). The dynamic compiler (104) includes functionality to generate a new optimized compilation graph by applying an optimization to an existing optimized compilation graph. The dynamic compiler (104) includes functionality to generate a series of optimized compilation graphs (122A, 122N) by applying a series of optimizations according to a series of optimization parameters (120A, 120N).

The dynamic compiler (104) includes a feature extractor (142), a machine learning model (144), and an execution engine (146). The feature extractor (142) includes functionality to extract one or more features from a compilation graph (e.g., an initial compilation graph (114) or an optimized compilation graph (122A)). A feature may be a characteristic of the function (112) corresponding to the compilation graph. Examples of features include: number of local variables, number of loops, number of branches, number of memory operations, maximum loop depth, average number of nodes per loop, etc.

The execution engine (146) includes functionality to obtain the values of one or more performance metrics while executing a compilation graph. A performance metric measures an aspect of the execution of the compilation graph. Examples of performance metrics include: time spent executing a function, time spent executing a loop in a function, number of memory operations in a function, number of memory operations in a loop in a function, number of nodes added or removed from the compilation graph, etc. In one or more embodiments, a compilation graph includes one or more instrumentation nodes (not shown) that include functionality, when executed, to obtain the values of one or more performance metrics. For example, an instrumentation node may obtain a timestamp that may be used in the calculation of the time spent executing a function, or the time spent executing a loop in a function. Continuing this example, an instrumentation node may account for additional factors affecting the measurement of execution time, such as context switches at safepoints or checkpoints.

Continuing with FIG. 1A, the training database (130) includes features (132F, 132R), optimization parameter values (134J-Q, 134 W-Z), and performance metrics (136J-Q, 136W-Z). The training database (130) includes functionality to store, for a given set of one or more features (132F), one or more sets of optimization parameter values (134J-Q, 134W-Z) corresponding to one or more sets of performance metrics (136J-Q, 136W-Z). Each set of optimization parameter values (e.g., optimization parameter values (134J-Q)) corresponds to a specific optimization parameter (e.g., optimization parameter A (120A)). For example, an optimization parameter for a loop peeling optimization may correspond to the set of (Boolean) optimization parameter values: {(loopA and loopB), (loopA and not(loopB)), (not(loopA) and loopB), (not(loopA) and not(loopB)}, where each optimization parameter value corresponds to a set of one or more performance metrics. Continuing this example, the optimization parameter value (loopA and not(loopB)) for the loop peeling optimization may correspond to the following performance metrics: a loop execution time of 20 microseconds, and 8 nodes added to the compilation graph.

The machine learning model (144) may be a type of deep learning classifier based on neural networks. Alternatively, the machine learning model (144) may be based on a traditional machine learning approach, such as a k-nearest neighbors, support vector machine, decision tree, naïve Bayes, random forest, etc. For online learning, approaches like reinforcement learning may be used. Deep learning, also known as deep structured learning or hierarchical learning, is part of a broader family of machine learning methods based on learning data representations, as opposed to task-specific algorithms. The machine learning model (144) includes functionality to learn relationships between features, optimization parameter values, and performance metrics. The machine learning model (144) may be trained "offline" using the features (132F, 132R), optimization parameter values (134J-Q, 134W-Z), and performance metrics (136J-Q, 136W-Z) included in the training database (130). For example, training the machine learning model (144) offline may result in a baseline, domain-independent model based on executing various benchmark functions. Additionally or alternatively, the machine learning model (144) may be trained "online" as described in Step 206 below.

The machine learning model (144) includes functionality to generate, as output, an optimization parameter value given an input that includes a set of features and an optimization parameter. For example, the machine learning model (144) may assign confidence levels to different optimization parameter values (134J-Q, 134W-Z) indicating a probability that the corresponding optimization parameter value will perform better than other optimization parameter values as measured by performance metrics, given a set of features.

Depending on the nature of the optimization parameter, the machine learning task may be either a classification or regression task. For example, while a loop peeling optimization may be modeled as classification (e.g., peel or not peel), evaluating a code size performance metric of an optimization parameter value may be modeled as regression. values of the optimization parameter are applied to the initial compilation graph to generate versions of the initial compilation graph.

Figure 1B:
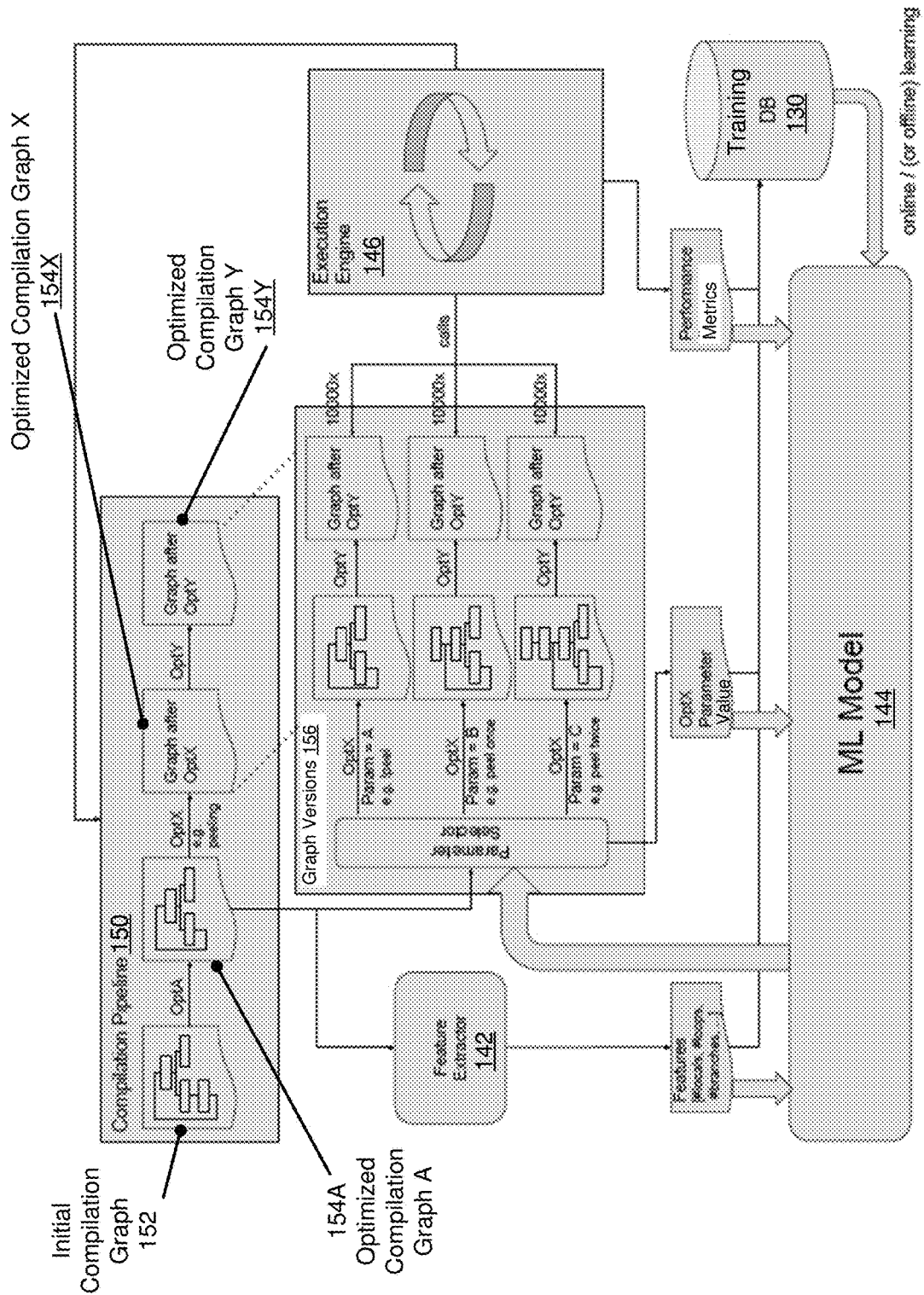

FIG. 1B shows an example of a compilation pipeline (150) that includes a series of compilation graphs including an initial compilation graph (152) and optimized compilation graphs (154A, 154X, 154Y). The dynamic compiler (104) includes functionality to transform the initial compilation graph (152) into optimized compilation graph A (154A) by applying optimization parameter A to the initial compilation graph (152). Similarly, the dynamic compiler (104) includes functionality to transform optimized compilation graph A (154A) into optimized compilation graph X (154X) by applying optimization parameter X to optimized compilation graph A (154A). Finally, the dynamic compiler (104) includes functionality to transform optimized compilation graph X (154X) into optimized compilation graph Y (154Y) by applying optimization parameter Y to optimized compilation graph X (154X). FIG. 1B further shows multiple graph versions (156) of compilation graphs. Each version of a compilation graph may correspond to a value of an optimization parameter. For example, FIG. 1B shows three versions of optimized compilation graph X (154X) corresponding to three values of optimization parameter X, a loop peeling parameter:

1) optimization parameter X value="!peel": corresponds to a graph version in which no loop peeling has been applied;
2) optimization parameter X value="peel once": corresponds to a graph version in which loop peeling has been applied once to a particular loop; and
3) optimization parameter X value="peel twice": corresponds to a graph version in which loop peeling has been applied twice to a particular loop.

The dynamic compiler (104) includes functionality to select values of optimization parameter X by applying the machine learning model (144) to optimization parameter X and the feature(s) extracted by the feature extractor (142) from optimized compilation graph A (154A). The execution engine (146) includes functionality to repeatedly execute each version of optimized compilation graph X (154X) to obtain performance metrics. The execution engine (146) includes functionality to store the features, optimization parameter values, and performance metrics in the training database (DB) (130), which may be used to train and/or refine (e.g., retrain) the machine learning (ML) model (144).

In one or more embodiments, the computer processor(s) (106) takes the form of the computer processor(s) (502) described with respect to FIG. 5A and the accompanying description below. In one or more embodiments, the computer processor (106) includes functionality to execute the dynamic compiler (104).

While FIGS. 1A and 1B show a configuration of components, other configurations may be used without departing from the scope of the invention. For example, various components may be combined to create a single component. As another example, the functionality performed by a single component may be performed by two or more components.

Figure 2:
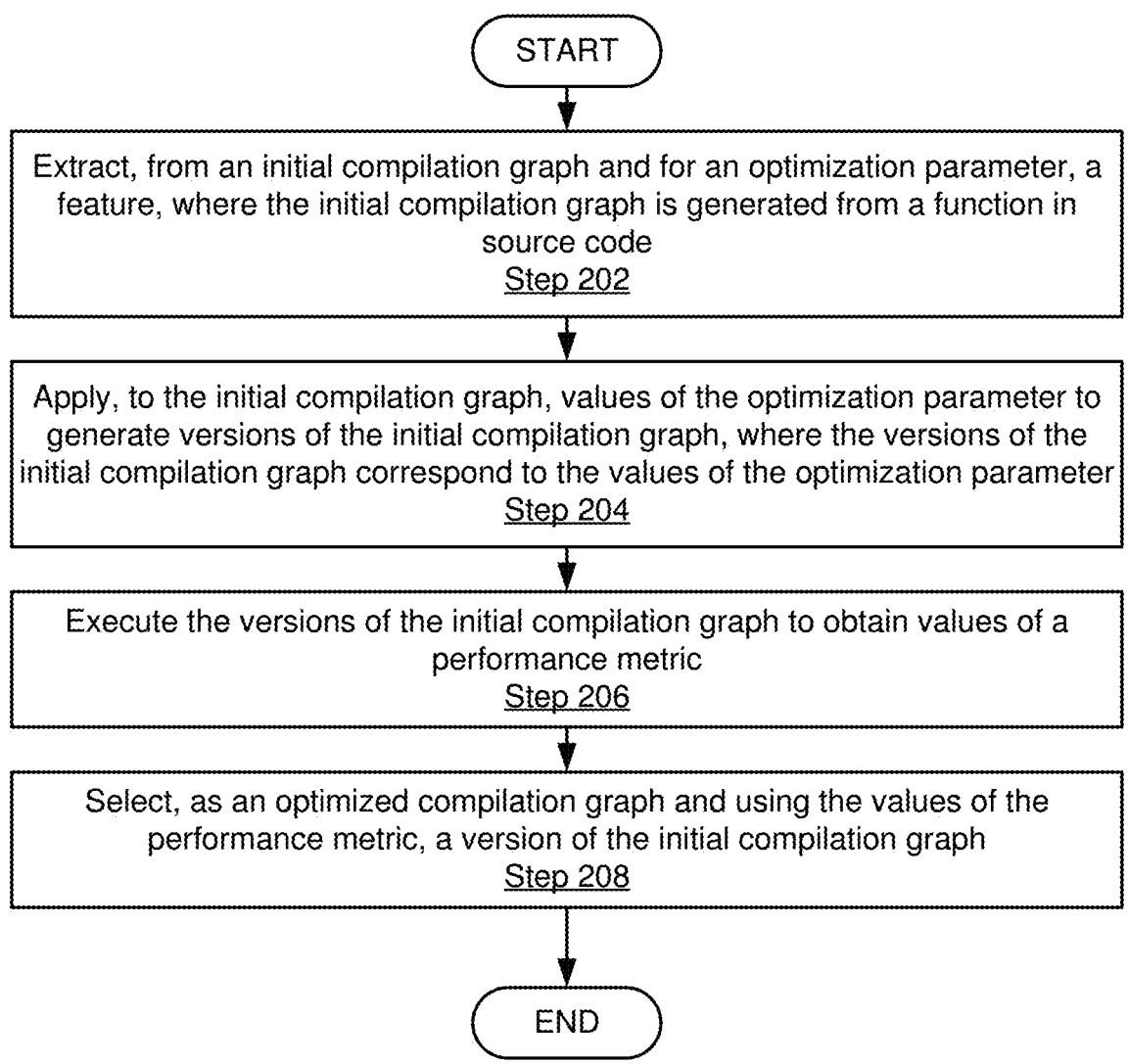
FIG. 2 and FIG. 3 show flowcharts in accordance with one or more embodiments of the invention.

FIG. 2 shows a flowchart in accordance with one or more embodiments of the invention. The flowchart depicts a process for optimizing a compilation graph. One or more of the steps in FIG. 2 may be performed by the components (e.g., the dynamic compiler (104) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a feature is extracted from an initial compilation graph and for an optimization parameter. The dynamic compiler may generate the initial compilation graph from a function in source code. The source code may be obtained from a repository. Alternatively, the initial compilation graph may be a compilation graph that has already been optimized (e.g., due to the application of one or more optimization parameters). For example, the initial compilation graph may be a compilation graph at any point in a compilation pipeline. The dynamic compiler may extract multiple features from the initial compilation graph. As an example, the optimization parameter may control how a loop peeling optimization is applied. Continuing this example, the dynamic compiler may extract the feature(s) using a table of features known to correspond to the optimization parameter. Further continuing this example, the feature(s) extracted for the optimization parameter may include a number of loops and/or a maximum loop depth and/or nodes of a loop to be peeled.

In Step 204, values of the optimization parameter are applied to the initial compilation graph to generate versions of the initial compilation graph. If the optimization parameter has a finite set of possible values, the dynamic compiler may generate a version of the initial compilation graph for each possible value of the optimization parameter. For example, a loop peeling optimization parameter value may be a Boolean expression indicating which of two loops are to be peeled. Continuing this example, possible values of the loop peeling optimization parameter are: (loopA and loopB), (loopA and not(loopB)), (not(loopA) and loopB), (not (loopA) and not(loopB)).

Alternatively, if the optimization parameter has an infinite set or an infeasibly large set of possible values, the dynamic compiler may generate versions of the initial compilation graph for a subset of values of the optimization parameter. For example, the dynamic compiler may select the subset of values of the optimization parameter which target more frequently executed parts of the initial compilation graph. As another example, the dynamic compiler may randomly select the subset of values of the optimization parameter. As yet another example, the dynamic compiler may use a pre-trained machine learning model to select the subset of values of the optimization parameter to reduce the state space of possible values of the optimization parameter that are expected to yield "good" results.

The dynamic compiler may generate the versions of the initial compilation graph while executing the function.

In Step 206, the versions of the initial compilation graph are executed to obtain values of a performance metric. The versions of the initial compilation graph have a common "past" (i.e., each version is derived from the same initial compilation graph). In contrast, traditional dynamic compilation systems which collect data by changing parameters in between different executions of a compilation graph do not generate different versions of a same compilation graph. The execution engine of the dynamic compiler may evaluate the performance of the multiple "forked" versions of the initial compilation graph by obtaining the values of one or more performance metrics while executing each of the versions of the initial compilation graph. For example, the execution engine may obtain the performance metrics from one or more instrumentation nodes added to the initial compilation graph.

The performance metrics may be used to train a machine learning model. The training may be offline, for example, where the function is a benchmark function (e.g., used to train a baseline domain-independent model). Alternatively, the training may be online, for example, when the function is executed by a user (e.g., a developer). The dynamic compiler may evaluate the performance of the multiple versions of the initial compilation graph within a single (e.g., uninterrupted) execution of the function at runtime, resulting in efficient performance evaluation, and thus resulting in efficient online training that incrementally updates the machine learning model.

The dynamic compiler may combine the versions of the initial compilation graph into a combined compilation graph that includes dispatch logic to select one of the versions for execution at runtime. The execution engine of the dynamic compiler may repeatedly execute the combined compilation graph in order to accumulate training data for the training database. The dispatch logic may cause the different versions of the initial compilation graph to be executed an equal number of times while accumulating the training data. Thus, within a single execution of the function, the dynamic compiler may accumulate a substantial amount of training data via repeated execution of the combined compilation graph.

In Step 208, a version of the initial compilation graph is selected as an optimized compilation graph using the values of the performance metric. The dynamic compiler may select the version of the initial compilation graph corresponding to the "best" values of the performance metrics obtained in Step 206 above. After executing the function for a number of times exceeding a threshold, the dynamic compiler may deoptimize the function by replacing the function with a best version of the initial compilation graph. In other words, the threshold may indicate when sufficient (e.g., statistically significant) training data has been gathered for the initial compilation graph, the optimization parameter, and the feature. The best version of the initial compilation graph may be determined by the state of a machine learning model (e.g., based on the values of the performance metrics learned from training data used to train the machine learning model) when the threshold is reached. Thus, the best version of the initial compilation graph may or may not be the same version of the initial compilation graph selected as the optimized compilation graph.

The dynamic compiler may store the feature(s) extracted from the initial compilation graph, the optimization parameter value, and the values of the performance metrics in a database. The dynamic compiler may use the information stored in the database for later offline training of the machine learning model (see description of Step 206 above). Alternatively, the dynamic compiler may use the information stored in the database to dynamically update the machine learning model with new data (e.g., during an online training mode that dynamically retrains the machine learning model, as described in Step 206 above).

The dynamic compiler may re-execute the process of FIG. 2 for the optimized compilation graph and another optimization parameter to generate another optimized compilation graph, and so on, resulting in a series of one or more optimized compilation graphs each generated by applying an optimization parameter to the previous optimized compilation graph in the series.

Figure 3:
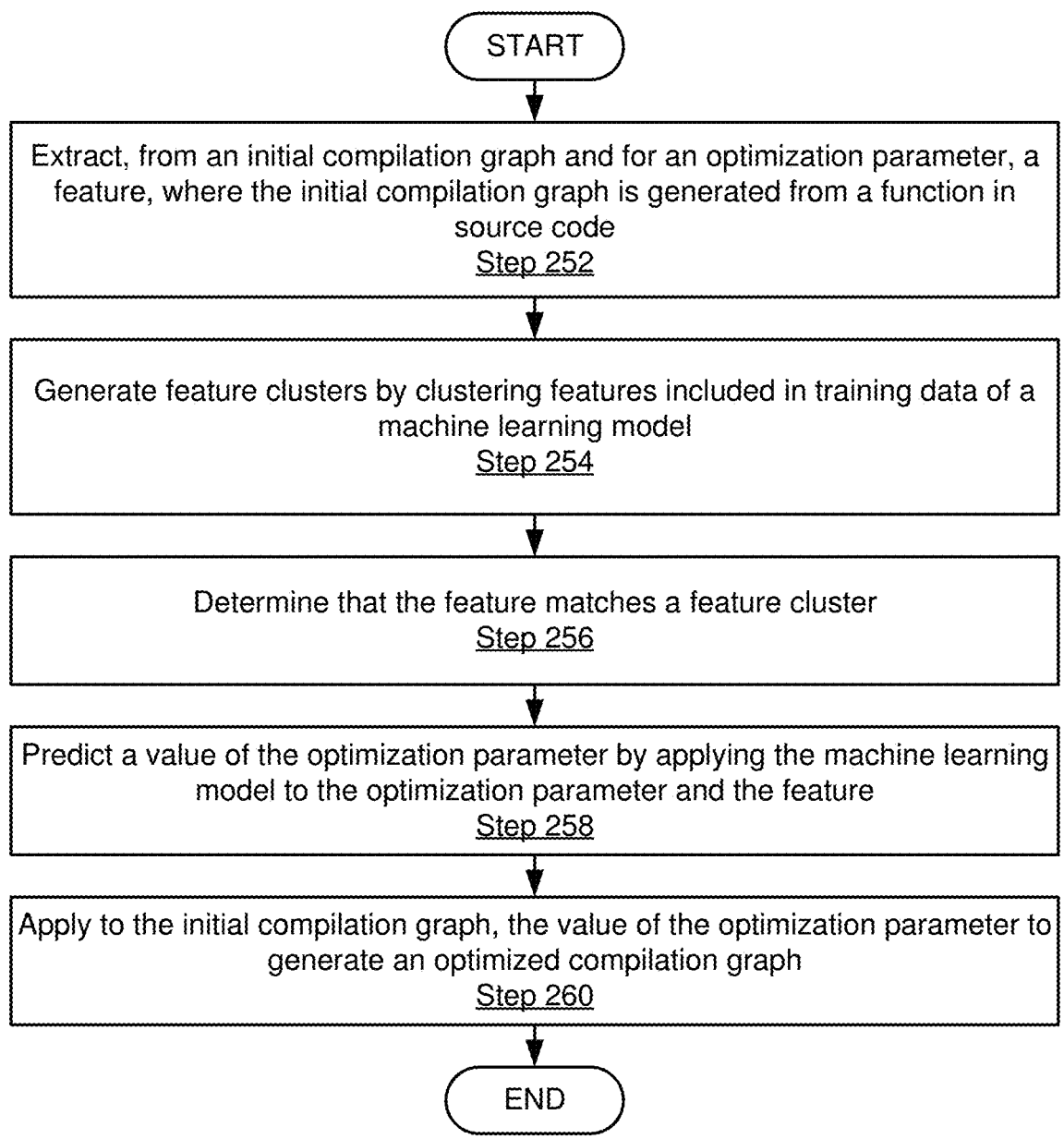

FIG. 3 shows a flowchart in accordance with one or more embodiments of the invention. The flowchart depicts a process for optimizing a compilation graph. One or more of the steps in FIG. 3 may be performed by the components (e.g., the dynamic compiler (104) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 252, a feature is extracted from an initial compilation graph and for an optimization parameter (see description of Step 202 above).

In Step 254, feature clusters are generated by clustering features included in training data of a machine learning model. The dynamic compiler may generate the feature clusters by clustering feature vectors included in the training data.

In Step 256, it is determined that the feature matches a feature cluster. For example, the dynamic compiler may use a similarity criterion to determine that the feature extracted from the initial compilation graph in Step 252 above matches the feature cluster. Alternatively, if the feature fails to match any feature cluster, the dynamic compiler may trigger the process of FIG. 2 that leverages compilation graph forking, and retrain the machine learning model using new training data. For example, the new training data may include a feature cluster that matches the feature. In other words, the compilation graph forking process may be used to generate (offline and/or online) training data for the machine learning model. In contrast, the process of FIG. 3 leverages machine learning prediction.

In Step 258, a value of the optimization parameter is predicted by applying a machine learning model to the optimization parameter and the feature. For example, the machine learning model may predict the value of the optimization parameter with the highest assigned confidence level given the feature extracted in Step 252 above.

In Step 260, the value of the optimization parameter is applied to the initial compilation graph to generate an optimized compilation graph.

Figure 4:
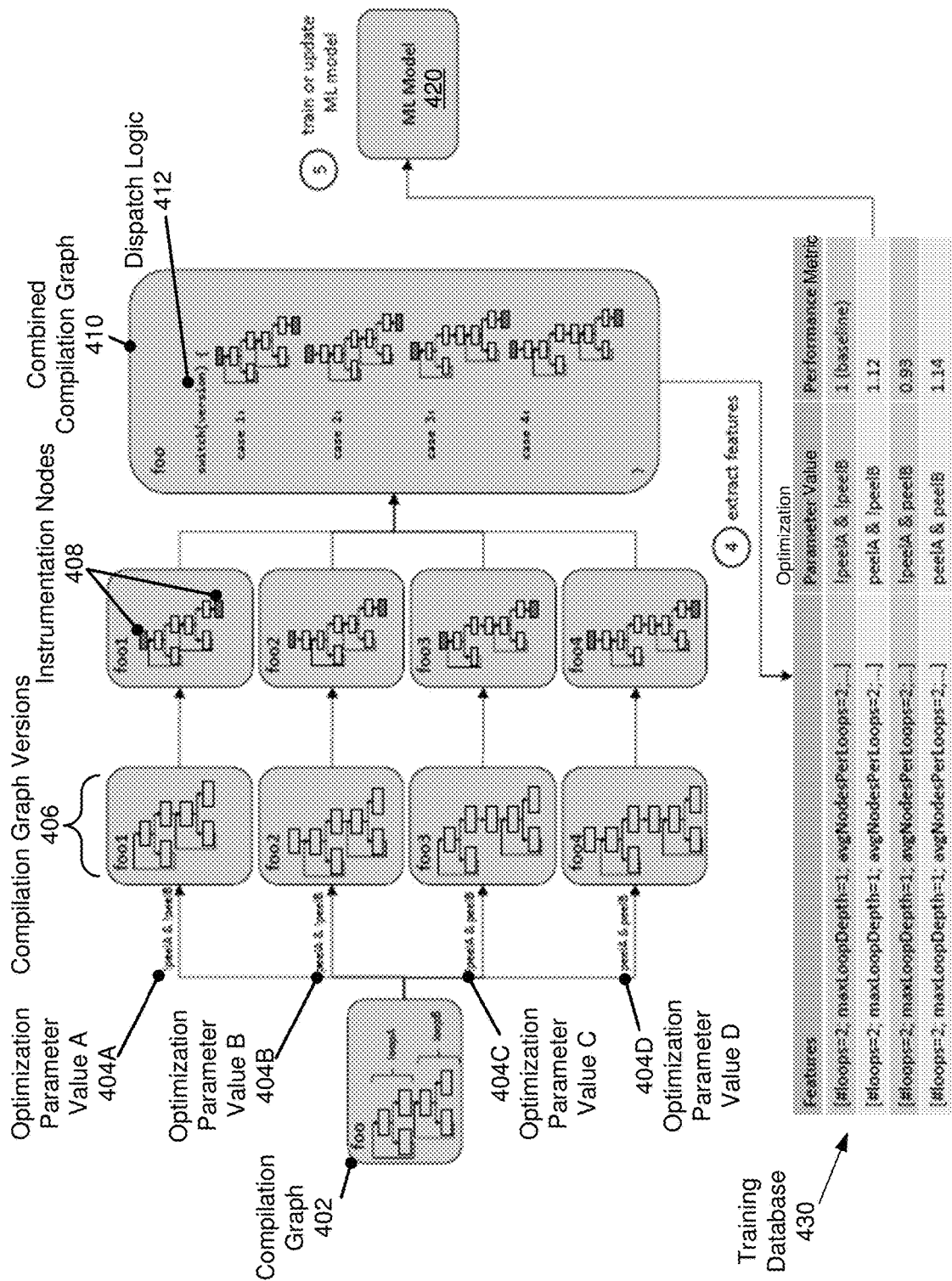
FIG. 4 shows an example in accordance with one or more embodiments of the invention.

FIG. 4 shows an implementation example in accordance with one or more embodiments. The implementation example is for explanatory purposes only and not intended to limit the scope of the invention. One skilled in the art will appreciate that implementation of embodiments of the invention may take various forms and still be within the scope of the invention.

FIG. 4 shows a compilation graph (402) ((114, 122A, 122N) in FIG. 1A and (152, 154A, 154X, 154Y) in FIG. 1B) generated from a function in source code by a dynamic compiler. The dynamic compiler generates, using a process based on compilation graph forking, compilation graph versions (406) corresponding to optimization parameter values (404A, 404B, 404C, 404D) ((134J-Q, 134W-Z) in FIG. 1A) for features extracted from the compilation graph (402). An exemplary subset of relevant features for the loop peeling optimization parameter are: number of loops, maximum loop depth, and average number of nodes per loop. The compilation graph (402) includes two loops: loopA and loopB. Each of the compilation graph versions (406) corresponds to a specific optimization parameter value.

The optimization parameter values (404A, 404B, 404C, 404D) are Boolean expressions corresponding to a loop peeling optimization parameter, indicating whether or not to peel loopA and/or loopB. That is, optimization parameter value A (404A) indicates that neither loopA nor loopB is peeled, optimization parameter value B (404B) indicates that loopA but not loopB is peeled, optimization parameter value C (404C) indicates that loopB but not loopA is peeled, and optimization parameter value D (404D) indicates that both loopA and loopB are peeled. In this non-limiting example, the compilation graph versions (406) each include instrumentation nodes (e.g., instrumentation nodes (408)) at the beginning and the end of the respective compilation graph version. The instrumentation nodes obtain timestamps that are used by the dynamic compiler to calculate a performance metric that measures the time spent executing the corresponding compilation graph version.

The dynamic compiler combines the compilation graph versions (406) into a combined compilation graph (410) that includes dispatch logic (412) to select one of the compilation graph versions (406) for execution.

The dynamic compiler generates a training database (430) ((130) in FIG. 1A) that is used to dynamically train a machine learning model (420) ((144) in FIG. 1A). The training database (430) includes the value of the performance metric given the features and optimization parameter value.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
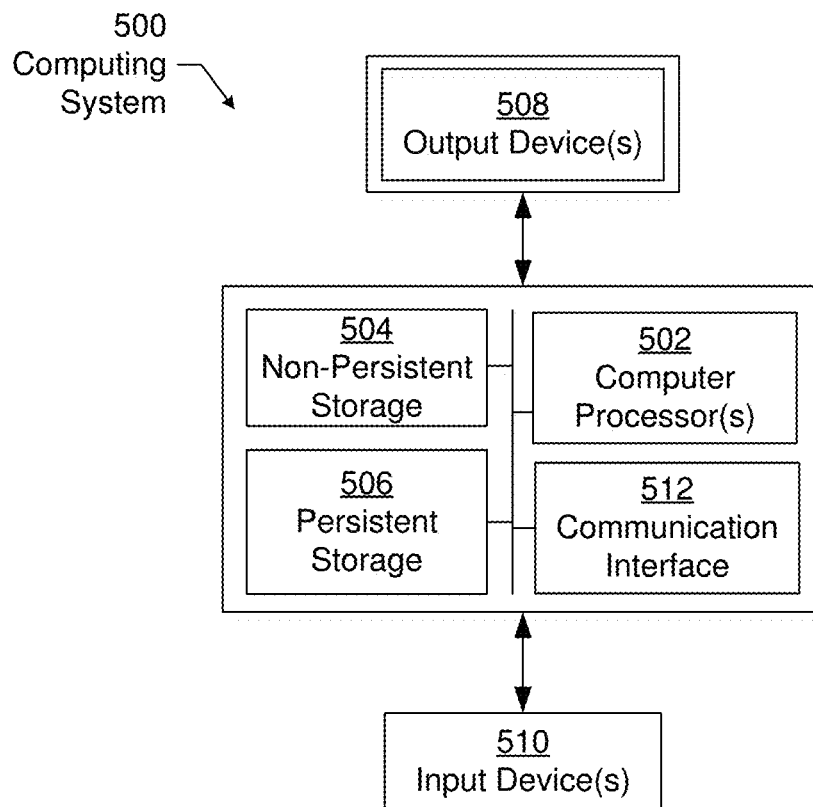
FIG. 5A and FIG. 5B show computing systems in accordance with one or more embodiments of the invention.
Figure 5B:
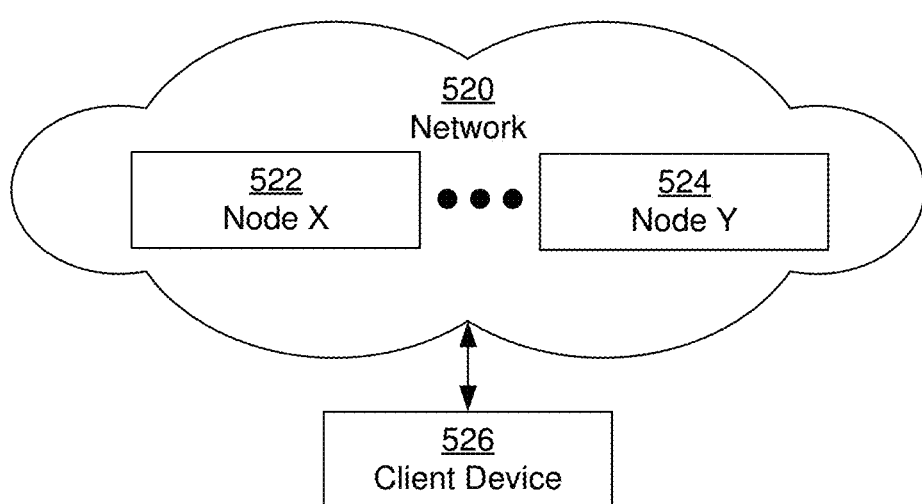

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    extracting, from an initial compilation graph and for a first optimization parameter, a first feature, wherein the initial compilation graph is generated from a function in source code;
    applying, to the initial compilation graph, a plurality of values of the first optimization parameter to generate a plurality of versions of the initial compilation graph, wherein the plurality of versions of the initial compilation graph correspond to the plurality of values of the first optimization parameter;
    executing the plurality of versions of the initial compilation graph to obtain a first plurality of values of a performance metric; and
    selecting, as a first optimized compilation graph and using the first plurality of values of the performance metric, a first version of the plurality of versions of the initial compilation graph.

2. The method of claim 1, further comprising:
    storing, in a database, the first feature, the plurality of values of the first optimization parameter, and the first plurality of values of the performance metric.

3. The method of claim 1, further comprising:
    adding, to each of the plurality of versions of the initial compilation graph, an instrumentation node that, when executed, obtains a value of the performance metric.

4. The method of claim 1, further comprising:
    generating a combined compilation graph comprising the plurality of versions of the initial compilation graph and dispatch logic comprising functionality to select one of the plurality of versions of the initial compilation graph when the combined compilation graph is executed.

5. The method of claim 1,
    extracting, from the first optimized compilation graph and for a second optimization parameter, a second feature;
    applying, to the first optimized compilation graph, a plurality of values of the second optimization parameter to generate a plurality of versions of the first optimized compilation graph, wherein the plurality of versions of the first optimized compilation graph correspond to the plurality of values of the second optimization parameter;
    executing the plurality of versions of the first optimized compilation graph to obtain a second plurality of values of the performance metric; and
    selecting, as a second optimized compilation graph and using the second plurality of values of the performance metric, a version of the plurality of versions of the first optimized compilation graph.

6. The method of claim 1, further comprising:
    determining that a number of executions of the function exceeds a threshold; and
    in response to determining that the number of executions of the function exceeds the threshold, replacing the initial compilation graph with a second version of the plurality of versions of the initial compilation graph.

7. The method of claim 6, wherein the second version of the initial compilation graph is selected using the first plurality of values of the performance metric.

8. The method of claim 1, further comprising:
    generating, using a trained machine learning model, the plurality of values of the first optimization parameter.

9. The method of claim 1, wherein the plurality of versions of the initial compilation graph are generated while executing the function.

10. A system comprising:
    a computer processor;
    a repository configured to store (i) source code comprising a function, (ii) an initial compilation graph generated from the function, and (iii) a first optimized compilation graph; and
    a dynamic compiler, executing on the computer processor and configured to:
        extract, from the initial compilation graph and for a first optimization parameter, a first feature,
        apply, to the initial compilation graph, a plurality of values of the first optimization parameter to generate a plurality of versions of the initial compilation graph, wherein the plurality of versions of the initial compilation graph correspond to the plurality of values of the first optimization parameter,
        execute the plurality of versions of the initial compilation graph to obtain a first plurality of values of a performance metric, and
        select, as a first optimized compilation graph and using the first plurality of values of the performance metric, a first version of the plurality of versions of the initial compilation graph.

11. The system of claim 10, wherein the dynamic compiler is further configured to:
    store, in a database, the first feature, the first plurality of values of the first optimization parameter, and the first plurality of values of the performance metric.

12. The system of claim 10, wherein the dynamic compiler is further configured to:

add, to each of the plurality of versions of the initial compilation graph, an instrumentation node that, when executed, obtains a value of the performance metric.

13. The system of claim 10, wherein the dynamic compiler is further configured to:
generate a combined compilation graph comprising the plurality of versions of the initial compilation graph and dispatch logic comprising functionality to select one of the plurality of versions of the initial compilation graph when the combined compilation graph is executed.

14. The system of claim 10, wherein the dynamic compiler is further configured to,
extract, from the first optimized compilation graph and for a second optimization parameter, a second feature,
apply, to the first optimized compilation graph, a plurality of values of the second optimization parameter to generate a plurality of versions of the first optimized compilation graph, wherein the plurality of versions of the first optimized compilation graph correspond to the plurality of values of the second optimization parameter,
execute the plurality of versions of the first optimized compilation graph to obtain a second plurality of values of the performance metric, and
select, as a second optimized compilation graph and using the second plurality of values of the performance metric, a version of the plurality of versions of the first optimized compilation graph.

15. The system of claim 10, wherein the dynamic compiler is further configured to:
determine that a number of executions of the function exceeds a threshold; and
in response to determining that the number of executions of the function exceeds the threshold, replace the initial compilation graph with a second version of the plurality of versions of the initial compilation graph.

16. The system of claim 15, wherein the dynamic compiler selects the second version of the initial compilation graph using the first plurality of values of the performance metric.

17. The system of claim 10, wherein the dynamic compiler generates the plurality of versions of the initial compilation graph while executing the function.

18. A method comprising:
extracting, from an initial compilation graph and for a first optimization parameter, a first feature, wherein the initial compilation graph is generated from a function in source code;
generating a first plurality of feature clusters by clustering a first plurality of features included in first training data of a machine learning model;
determining that the first feature matches a feature cluster in the first plurality of feature clusters;
predicting a value of the first optimization parameter by applying the machine learning model to the first optimization parameter and the first feature; and
applying, to the initial compilation graph, the value of the first optimization parameter to generate a first optimized compilation graph.

19. The method of claim 18, further comprising:
training the machine learning model by executing a plurality of versions of the initial compilation graph to obtain a plurality of values of a performance metric,
wherein the plurality of versions of the initial compilation graph correspond to a plurality of values of the first optimization parameter, and
wherein the first training data further comprises the plurality of values of the first optimization parameter and the plurality of values of the performance metric.

20. The method of claim 18, further comprising:
extracting, from the initial compilation graph and for a second optimization parameter, a second feature;
determining that the second feature fails to match any feature cluster in the plurality of feature clusters;
generating a second plurality of feature clusters by clustering a second plurality of features; and
retraining the machine learning model using second training data comprising the second plurality of features.

* * * * *